(No Model.)
C. & M. C. JACKSON.
Stove Pipe.
No. 239,505.                    Patented March 29, 1881.
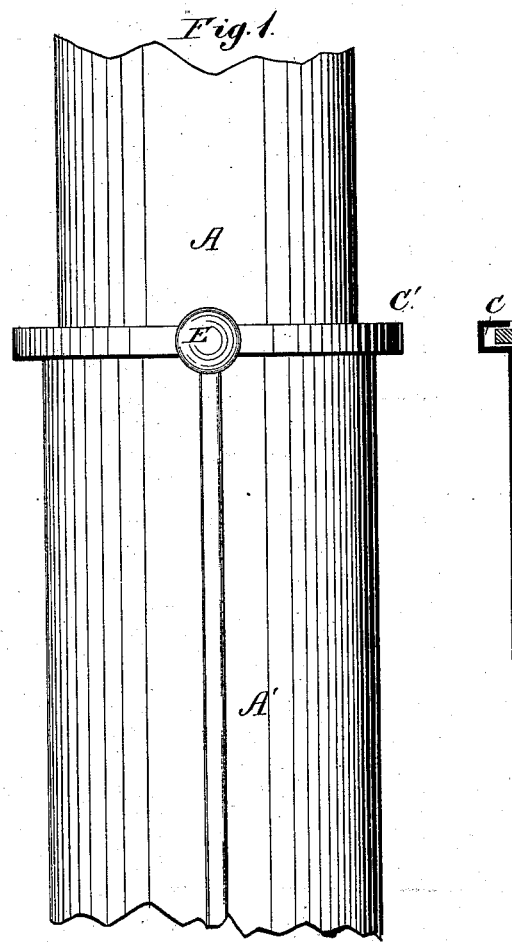
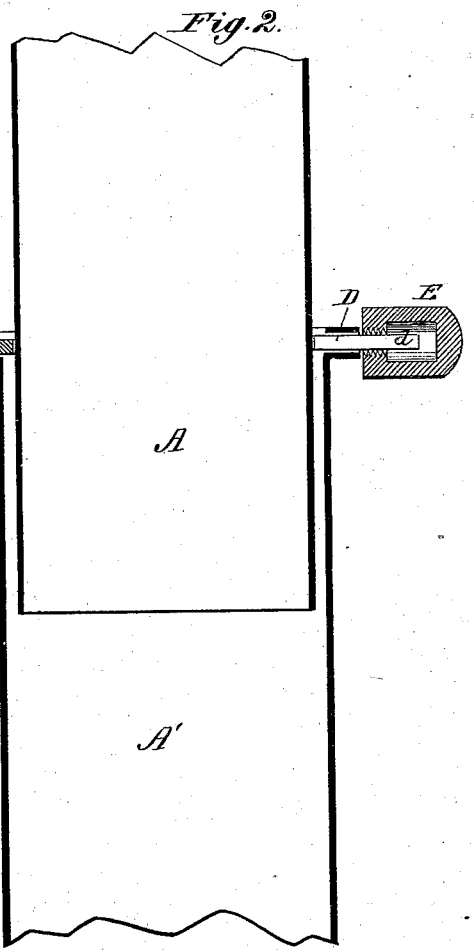
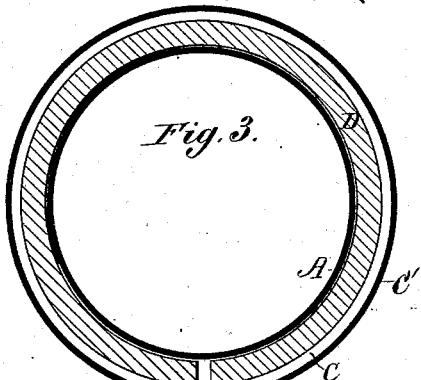
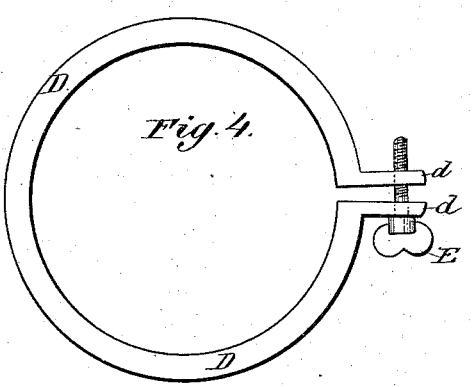
WITNESSES:
INVENTOR:
C. Jackson
M. C. Jackson
BY
ATTORNEYS.

United States Patent Office.

CORTES JACKSON AND MANETHO C. JACKSON, OF DENVER, COLORADO.

STOVE-PIPE.

SPECIFICATION forming part of Letters Patent No. 239,505, dated March 29, 1881.

Application filed October 7, 1880. (No model.)

*To all whom it may concern:*

Be it known that we, CORTES JACKSON and MANETHO C. JACKSON, of Denver, in the county of Arapahoe and State of Colorado, have invented a new and Improved Adjustable Stove-Pipe; and we do hereby declare that the following is a full, clear, and exact description of the same.

Our invention relates to stove-pipes that may be adjusted to fit pipes of various sizes, so that one may be telescoped within the other any desired distance to lengthen or shorten the line of pipe and to make a closely-fitting joint.

The object of our invention is to provide one end of a pipe-section with an adjustable clamping device to form the joint without contracting or expanding the walls of the pipe, and thereby breaking the longitudinal joint of the pipe-section; and the improvement consists in forming a pipe-section of sheet metal with a tightly folded or riveted longitudinal joint, and with one of its ends formed with an internal circumferential crease, into which is fitted a metal hoop, the ends of which are connected by a set-screw to form an expanding packing-ring that will closely fit and clamp the ends of pipe-sections of various diameters, as will hereinafter more fully appear.

In the accompanying drawings, Figure 1 is a side elevation of our improved adjustable section connected to a section of ordinary pipe; Fig. 2, a longitudinal section of the same; Fig. 3, a transverse vertical section thereof on the line x x of Fig. 1; and Fig. 4, an elevation of a packing-ring, showing a modification thereof.

The adjustable section A' of pipe A is formed of a single piece of sheet metal, creased, crimped, and, rolled by suitable well-known means to form a depression at one end of the pipe that will admit of its ready insertion into the next pipe-section in the ordinary manner. A crease or circumferential channel, C, is made at the edge of the other end of the pipe-section A', and forms an external band or collar, C', upon the outside and at the end of the pipe. The seam of the pipe may be made by crimping the edges of the metal sheet and interlocking them in any well-known manner, or by riveting the edges or permanently uniting them by any desired means to form a rigid unbroken pipe-section. A rectangular rod, of metal, is bowed to form a hoop or ring, D, of a diameter to fit the interior of the channel C at end of the pipe-section, and its ends are connected by a set-screw, E, by which means the hoop may be expanded or contracted to closely fit and clamp the outer surface of an intersecting pipe-section of a diameter differing materially from that of the adjustable section A. The ends of the packing-ring D are outwardly turned to form ears *d d*, which may be made of conical shape and formed with a screw-thread upon their outer surfaces, upon which a screw-cap, E', may be fitted to contract it as it is screwed down upon the cone, and allow it to expand by its elasticity when the cap is screwed upon the upper and smaller end of the conical ears.

A modified means for adjusting the ring is shown in Fig. 4, and consists in simply passing a set-screw through holes in the ears *d* of the ring D, one of which ears is screw-threaded to fit the thread of the set-screw in a well-known manner.

By this simple means the discomforts caused by fitting up stove-pipes are obviated. A single adjustable section will be found sufficient for ordinary lengths of pipe, and a connection may be made thereby between any desired points without cutting the pipe or mashing or stripping the pipe-sections by trying to force the end of one section of pipe into the other.

What we claim as new is—

An adjustable section of stove-pipe made with an unbroken longitudinal joint and formed with a circumferential channel, C, in its end, in combination with a clamping or packing ring or hoop provided with a set-screw for expanding or contracting the hoop to suit different sizes of pipe, substantially as described.

CORTES JACKSON.
MANETHO CORTES JACKSON.

Witnesses:
ROBERT BRIGGS,
J. C. CLINTON.